(12) United States Patent  
Rosen

(10) Patent No.: US 7,646,312 B2
(45) Date of Patent: Jan. 12, 2010

(54) METHOD AND SYSTEM FOR AUTOMATED DETECTION OF MOBILE TELEPHONE USAGE BY DRIVERS OF VEHICLES

(76) Inventor: Michael Rosen, 930 Kingswood Dr., Akron, OH (US) 44313

( * ) Notice: Subject to any disclaimer, the term of this patent is extended or adjusted under 35 U.S.C. 154(b) by 315 days.

(21) Appl. No.: 11/678,489

(22) Filed: Feb. 23, 2007

(65) Prior Publication Data
US 2008/0036623 A1 Feb. 14, 2008

Related U.S. Application Data

(60) Provisional application No. 60/837,594, filed on Aug. 11, 2006.

(51) Int. Cl.
G08G 1/017 (2006.01)
(52) U.S. Cl. .................. 340/937; 340/933; 340/936; 455/403
(58) Field of Classification Search .............. 340/907, 340/933, 936–937, 988–989
See application file for complete search history.

(56) References Cited

U.S. PATENT DOCUMENTS

| 5,515,042 | A | 5/1996 | Nelson | |
|---|---|---|---|---|
| 5,935,190 | A * | 8/1999 | Davis et al. | 701/119 |
| 5,948,038 | A | 9/1999 | Daly et al. | |
| 6,121,898 | A | 9/2000 | Moetteli | |
| 6,381,533 | B1 * | 4/2002 | Crane et al. | 701/200 |
| 6,687,497 | B1 | 2/2004 | Parvulescu et al. | |
| 6,720,889 | B2 | 4/2004 | Yamaki et al. | |
| 6,741,165 | B1 | 5/2004 | Langfahl et al. | |
| 6,758,089 | B2 | 7/2004 | Breed et al. | |
| 6,803,854 | B1 | 10/2004 | Adams et al. | |
| 6,810,321 | B1 * | 10/2004 | Cook | 701/117 |
| 6,914,541 | B1 * | 7/2005 | Zierden | 340/937 |
| 6,970,102 | B2 | 11/2005 | Ciolli | |
| 6,973,333 | B1 * | 12/2005 | O'Neil | 455/569.2 |
| 6,985,827 | B2 | 1/2006 | Williams et al. | |
| 2001/0050614 | A1 | 12/2001 | Yang | |
| 2003/0137408 | A1 | 7/2003 | Breiner | |
| 2004/0246139 | A1 | 12/2004 | Harris | |
| 2005/0215241 | A1 * | 9/2005 | Okada | 455/414.1 |
| 2006/0055561 | A1 | 3/2006 | Kamali et al. | |
| 2006/0286930 | A1 | 12/2006 | Rathus et al. | |

FOREIGN PATENT DOCUMENTS

DE 198 07 825 A1 9/1999

OTHER PUBLICATIONS

Sundeen, "Cell Phones And Highway Safety", 2005 State Legislative Update, Aug. 2005, National Conference of State Legislatures, Denver Colorado.

(Continued)

Primary Examiner—George A Bugg
Assistant Examiner—James Yang
(74) Attorney, Agent, or Firm—Christopher L. Parmelee

(57) ABSTRACT

A method and apparatus for automated detection of mobile telephone usage by drivers of vehicles is provided. The apparatus may include a detection system comprising at least one mobile phone signal receiving device, at least one image capturing device, and at least one computer. The mobile phone signal receiving device is operative to detect a mobile phone signal transmitted from a vehicle. The at least one image capturing device is operative to capture at least one image of the vehicle. The at least one computer is operative to store in a storage device, information associated with at least one of the mobile phone signal transmitted from the vehicle; and the at least one image of the vehicle. The information stored in the storage device may be used to determine if a person associated with the vehicle should be prosecuted for illegal use of a mobile phone while driving the vehicle.

19 Claims, 6 Drawing Sheets

OTHER PUBLICATIONS

Strayer, et al., "A Comparison of the Cell Phone Driver and the Drunk Driver", Human Factors, Summer 2006, pp. 381-391, vol. 48, No. 2, Human Factors and Ergonomics Society, Salt Lake City, UT.
Stutts, et al., "Distractions in Everyday Driving", Jun. 2003, AAA Foundation for Traffic Safety, Washington DC.
Wisniewski, "Assembley, No. 3939", Dec. 11, 2003, State of New Jersey.

"Senate Bill No. 1613", Sep. 15, 2006, State of California.
"Raised Bill No. 5553", Feb. 2004, State of Connecticut.
"An Act", Spring 2004, District of Columbia.
"2006 Annual Report", 2006, Quixote Corporation.
"Annual Report 2005", 2005, Redflex Holdings Limited.

* cited by examiner

METHOD AND SYSTEM FOR AUTOMATED DETECTION OF MOBILE TELEPHONE USAGE BY DRIVERS OF VEHICLES

CROSS REFERENCE TO RELATED APPLICATIONS

This application claims benefit of U.S. Provisional Application Ser. No. 60/837,594 filed on Aug. 11, 2006, which application is hereby incorporated herein by reference.

BACKGROUND ART

As mobile telephones have come into widespread use, people often use their mobile phones while driving vehicles. However, mobile phone usage by the driver of a vehicle can significantly distract the driver's attention from driving-related tasks. As result, mobile phone use while driving can significantly increase the risk of traffic violations and driving accidents.

Accordingly, it is desirable to provide a system and method which is operative to assist in decreasing traffic violations and driving accidents caused by mobile phone use while driving.

DISCLOSURE OF INVENTION

It is an aspect of at least one embodiment to provide a system and method which is operative to assist in decreasing traffic violations and driving accidents caused by cell phone use while driving.

Further aspects of embodiments will be made apparent in the following Best Modes for Carrying Out Invention and the appended claims.

The foregoing aspects may be accomplished in at least one embodiment by an apparatus that is capable of detecting illegal mobile phone usage taking place in a moving vehicle. In an embodiment, the apparatus comprises at least one mobile phone signal receiving device, at least one image capturing device, and at least one storage device. In addition the apparatus comprises at least one computer in operative connection with the mobile phone signal receiving device, the at least one image capturing device, and the at least one storage device.

The mobile phone signal receiving device is operative to detect a mobile phone signal transmitted from a vehicle. The at least one image capturing device is operative to capture at least one image of the vehicle from which the mobile phone signal is detected. The at least one computer is operative to store in the at least one storage device, the at least one image of the vehicle. In addition the at least one computer is operative to enable at least portions of the data stored in the at least one storage device to be used to determine if a person associated with the vehicle should be prosecuted for illegal use of a mobile phone while driving the vehicle.

In further embodiments, the at least one computer may be operative to store in the at least one storage device, information associated with the mobile phone signal transmitted from the vehicle. Also, in further embodiments, the apparatus may include a plurality of image capturing devices. At least one of the image capturing devices is operative to capture at least one image of a driver of the vehicle. Also, at least one of the image capturing devices is operative to capture at least one image of at least one license plate of the vehicle. The at least one computer is operative to store the images captured from the plurality of image capturing devices in the storage device.

In these described embodiments, the apparatus may further include a sensor device that is operative to acquire further information associated with the vehicle. For example, the sensor device may include a vehicle velocity measuring device operative to acquire a velocity associated with the vehicle. The at least one computer may store the velocity of the vehicle in the at least one storage device. The at least one computer may also compare characteristics of the mobile phone signal transmitted from the vehicle to the velocity of the vehicle to determine whether the vehicle corresponds to a source of the mobile phone signal.

In embodiments of the apparatus, the sensor device may correspond to a vehicle presence detector device operative to produce a signal indicating the presence of the vehicle. The at least one computer may trigger the capturing of the at least one image with the at least one image capturing device responsive to the signal indicating the presence of the vehicle. The computer may also compare characteristics of the mobile phone signal to characteristics of the signal indicating the presence of the vehicle to determine whether the vehicle corresponds to a source of the mobile phone signal.

In a further embodiment, the at least one computer may be operative to determine information included in the mobile phone signal such as a telephone number and/or a mobile phone identifier. The at least one computer may store the information determined from the mobile phone signal in the at least one storage device. In addition, a further embodiment may include at least two spaced apart antennas. Each antenna may be operative to produce a detected signal responsive to the mobile phone signal transmitted from the vehicle. The at least one computer may be operative to compare the detected signals from the at least two antennas to determine whether the vehicle corresponds to a source of the mobile phone signal.

Although the previous described embodiments correspond to an apparatus, it is to be understood that embodiments may also include methods of using the described apparatus to detect illegal use of a cell phone in a moving vehicle.

For example a method may include a step of receiving a mobile phone signal from a mobile telephone device located in a moving vehicle. Also such a method may include capturing at least one image of the vehicle from which the mobile phone signal is received, using at least one image capturing device. In addition, such a method may include through operation of the at least one computer, enabling the at least one image to be used to determine if a person associated with the vehicle should be prosecuted for illegal use of a mobile phone while driving the vehicle.

In this described embodiment, the method may also include storing the at least one image captured by the capturing device and the information associated with the mobile phone signal in at least one storage device. The computer may then operate to enable at least portions of the information and the at least one image stored in the at least one storage device to be used to determine if a person associated with the vehicle should be prosecuted for illegal use of a mobile phone while driving the vehicle. In this described method, the at least one image may include at least one image of the license plate of the vehicle and at least one image of the driver of the vehicle.

In a further embodiment, the method may include detecting with at least one sensor device further information associated with the vehicle. The at least one computer may be operative to store the further information detected with the at least one sensor device in the storage device.

As discussed previously, such a sensor device may correspond to a vehicle velocity measuring device operative to detect a velocity associated with the vehicle. In an embodiment, the method may include, through operation of the at least one computer, comparing characteristics of the mobile phone signal received to the velocity of the vehicle to determine whether the vehicle corresponds to a source of the mobile phone signal.

In further embodiments, the sensor device includes a vehicle presence detection device operative to produce a signal indicating the presence of the vehicle. In such an embodiment, the step of capturing at least one image of the vehicle may be carried out responsive to the signal indicating the presence of the vehicle.

In another embodiment, the image capturing device may be configured to continually capture images of vehicles. However, upon detection by the sensor device of the presence of the particular vehicle associated with the source of a detected mobile phone signal, the particular images of that vehicle may be stored in a manner which is flagged or is otherwise made available for use in the step of enabling the images to be used to determine if a person associated with the vehicle should be prosecuted.

Also, in these described embodiments the method may include through operation of the at least one computer, comparing characteristics of the mobile phone signal to characteristics of the signal indicating the presence of the vehicle to determine whether the vehicle corresponds to a source of the mobile phone signal. In addition the method may include determining information included in the mobile phone signal such as a telephone number and a mobile phone identifier.

In these described embodiments, the method may include determining at least one address associated with at least one of information included in the at least one image and information included in the mobile phone signal. The method may also include communicating at least one message to the determined address. Such a message may include information regarding the illegal usage of a mobile phone in the vehicle, such as a warning or a notice of a traffic citation.

In further embodiments, the method may include detecting at least two mobile phone signals respectively with at least two spaced apart antennas. Through operation of the at least one computer, responsive to the at least two mobile phone signals, the method may include determining whether the vehicle corresponds to a source of the mobile phone signal.

The previously described embodiments have been described with respect to different features and steps that may be included in the described apparatus and method. However, it is to be understood that the above described features and steps may be combined in different combinations depending on the desired functionality of an implementation of the described apparatus and method.

BEST MODES FOR CARRYING OUT INVENTION

Figure 1:
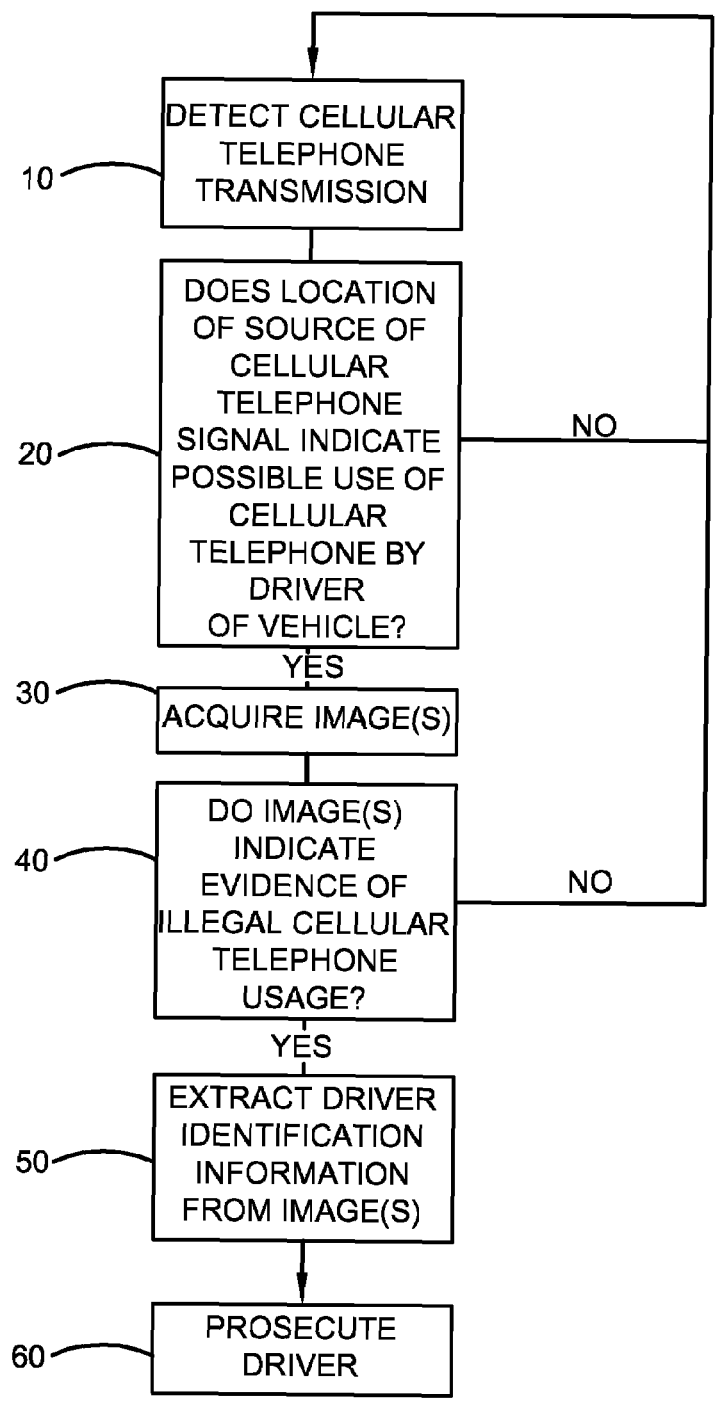
FIG. 1 is a flowchart of a method of detecting and prosecuting for illegal use of a mobile telephone by a driver.

Cellular ("cell") phones are known in the art. Cell phones are mobile telephones (also referred to herein as "mobile phones") which are capable of receiving and making telephone calls wirelessly within a cellular network. Other types of mobile phones include satellite phones which are capable of receiving and making telephone calls wirelessly using one or more orbiting satellites. Mobile phones may be packaged as handheld devices. Mobile phones may also be integrated into a vehicle or coupled to a vehicle or the driver, such that a driver may make and receive mobile phone calls without holding a portable device. Such devices are often referred to as "hands-free" phones and may include mobile phones integrated into the vehicle, mobile phones connected to the vehicle, mobile phones operated remotely through voice commands, and/or mobile phones operated using a headset. As used herein, a mobile phone includes any device capable of being used to carry out wireless phone calls while driving a vehicle.

Some states and other jurisdictions have passed legislation to forbid drivers from using cell phones while driving, or to allow only the use of hands-free cell phones by a driver while driving. Other jurisdictions may forbid all cell phone use while driving including the use of hands-free phones.

An embodiment includes a method of acquiring information leading to the detection and documentation of illegal mobile phone usage by a driver of a vehicle. This method is illustrated in the flowchart in FIG. 1.

A first step 10 in the method may include detecting a transmission from a mobile phone. A second step 20 in the method may include carrying out an evaluation of the signal to determine whether the signal indicates possible use of a mobile telephone by a driver (or other person) in a vehicle. This evaluation may comprise identifying a geographic location of the source of the mobile telephone transmission, and determining whether that location corresponds or potentially corresponds to a location within the physical bounds of a roadway.

If the source of a mobile telephone transmission does not correspond, or likely does not correspond, to a location within the physical space of a roadway, then no further action need be taken, and in that event, listening for and detection of appropriate transmission signals can continue. If there is detection of a mobile telephone transmission which originates or is likely to have originated within the physical boundaries of a roadway, this can initiate or permit further action which can comprise the acquisition of image data and/or other sensors.

The detection of a mobile telephone transmission can comprise operating a signal receiving device which may be tuned to detect signals at appropriate frequencies of the electromagnetic spectrum which is characteristic of mobile telephony usage. In current mobile telephony technology, there are several commonly used signal protocols and signal frequencies. Signal frequencies used for cellular telephone transmissions include 900 MHz, 1.8 GHz and 2.1 GHz. Protocols include frequency division multiple access (FDMA), code division multiple access (CDMA); wideband CDMA; Universal Mobile Telephone System (UMTS); and time division multiple access TDMA such as GSM (Global System for Mobile Communications). Other protocols include satellite telephone, Wi-Fi, analog cellular services (AMPS, or Advanced Mobile Phone Service) and EDGE and GPRS for cellular data services, which could carry voice via Voice Over Internet Protocol; and WiMAX. Still other protocols exist or are possible.

Any particular protocol may have associated with it, its own transmission frequency and its own standard source strength. The source strength of the mobile telephone transmission may be relevant for establishing a relationship between the signal strength received at the receiver and the distance between the transmitter and the receiver. It is possible that detected signal strength may be used as an indicator of how close the transmitting mobile telephone is to the detector, through the use of a known relationship between signal strength and distance. Because of the differences among the various protocols, such a relationship may be unique to a particular frequency band which is being monitored. There may be one relationship for one frequency and a different relationship for a different frequency.

In appropriate situations, the method may include a step 30 of acquiring images of the vehicle in the form of still images or video or both using an image capturing device such as a camera. Such images may be acquired from one camera or vantage point or from more than one camera or vantage point, as discussed elsewhere herein. At least some of the images may depict the driver and the portion of the vehicle in the region of the driver. At least some of the images may comprise sufficient detail to enable visual evaluation and decision-making about the existence of illegal mobile telephone usage, as described elsewhere herein. The images or other information acquired at the same time as the images, may be suitable to identify exactly where in the roadway the vehicle was when the images were taken, and to establish the existence of illegal mobile telephone usage.

Acquiring images may further comprise acquiring other information which may be associated with those images, such as the time when the images are acquired and the location where the data is taken. Also, at least some of the acquired images may be suitable for identifying the vehicle or its driver, typically by acquiring an image of the vehicle's license plate. Any or all of this image acquisition may continue for a predetermined duration of time after the start of image acquisition, and then may cease.

In addition, other information associated with the vehicle may also be acquired by one or more sensor devices. For example, a sensor device may include a vehicle velocity measuring device such as a radar or laser gun capable of detecting the velocity of the vehicle. Such a vehicle velocity measuring device may be located in a different location than the cameras. In other embodiments the road adjacent the mobile phone signal receiving devices may include other types of sensor devices such as a vehicle presence detection device. A vehicle presence detection device may include mechanical sensors which are activated by the weight of the vehicle. Such a vehicle presence detection device may also include optical, electromagnetic, and ultrasonic proximity detection sensors. The captured images and any other acquired information regarding the speed and/or position in time of the vehicle may be stored for later access to enable the system, law enforcement personnel, or other users to decide whether a law has been violated.

According to the details of current legislation in various jurisdictions, transmission of a mobile telephone signal from within the physical boundaries of a roadway may indicate but does not necessarily indicate activity which is legally prohibited. There are several possibilities, as follows. One possibility is that a passenger in a vehicle, rather than the driver, may be using a mobile telephone. Presumably this may be legal in many jurisdictions. Another possibility would be that the vehicle driver is using a hand-held mobile telephone while driving. If there is any form of mobile telephone usage which is illegal in a particular jurisdiction, most likely it is this activity which would be illegal (However, in the event that traffic in the particular roadway was at a standstill or the vehicle were on the shoulder of the roadway, such usage would presumably be legal). Yet another possibility is that the driver might be engaged in a mobile telephone conversation using a hands-free apparatus while driving. In some jurisdictions this action may be legal even if those same jurisdictions forbid use of a hand-held mobile telephone by the driver. In other jurisdictions, use of a mobile phone by a passenger while the car is moving may be legal, while in other jurisdictions it may not be legal for the passenger to use the mobile phone while the car is moving.

An embodiment of the described method may include a method step 40 of evaluating the images and other acquired data to make a determination as to whether a law has been violated with respect to the particular mobile phone call detected. For example, image analysis may be used to determine if the car is moving during the time period that mobile phone use was detected. Further the location of the vehicle in the images or the location detected by positional sensors in the road could be correlated with the features of the signals to verify that the particular vehicle being imaged corresponds to the vehicle from which cellular signals are emitting. In addition, a velocity captured for the vehicle may be compared to features of the mobile phone signals to verify that the vehicle being monitored is the correct vehicle from which mobile phone signals are being detected.

For example, the rise and fall of the signal strength of the mobile phone as the car moves toward and then away from an antenna of a mobile phone signal receiving device may be evaluated to determine a velocity of the mobile phone device. Such velocity information determined from the mobile phone signal may be compared to the velocity information determined from image data and/or a vehicle velocity measuring device. Correlation between the velocity information determined from the mobile phone and the velocity information determined from image data and/or other vehicle velocity measuring devices may be used by the system to determine that the vehicle being imaged corresponds to the source of the mobile phone signals. Also, the system may verify that the position of the vehicle at the peak signal strength for the mobile phone signal corresponds to the vehicle being at its closest position relative to the mobile phone detection sensor.

In further embodiments, the system may include image processing capabilities which are operative to determine whether the driver or passenger is holding a mobile phone. Further such image analysis may determine if a passenger is present in the vehicle. In embodiments of the method, one or more of these described determinations, correlations, and verifications may be carried out to determine if there is evidence that illegal mobile phone usage is taking place in a particular moving vehicle.

In embodiments, although one or more of these described determinations, correlations, and verifications may be carried out through operation of a computer processor in the system, it is also to be understood that one or more determinations may be carried out manually. For example the system may make available one or more of the captured images, video, positional data, velocity data, signal strength data, and/or any other data captured by the system associated with an event.

Law enforcement personnel or other users may view recorded images and may visually determine whether particular images show evidence of illegal mobile telephone usage (such as use of a hand-held mobile telephone) by a driver of a vehicle. If examination of images and/or other captured data indicates violation of a law by the driver (or passenger) of the vehicle, then the method may include the further step 50 of extracting information from images which can be used to automatically determine through operation of a computer and/or manually determine the identity of the vehicle or driver or both, such as from the license plate of the vehicle. In further embodiments the system may include one or more cameras positioned to specifically capture license plate information from the front and/or the back of a vehicle.

Finally, the method may include a step 60 of prosecuting the offender for illegal mobile phone usage. For purposes of prosecution, the images may be suitable to serve as evidence which can be used during prosecution of the offender. In an embodiment, the system may be operative to save in a database, one or more records corresponding to the event of the mobile phone usage. Such records may include the time, location and all or portions of the data captured for the event.

In addition, the system may be capable of facilitating the mailing of notices in the form of traffic tickets to the owner of the vehicles. Such notices may include a printed copy of the image(s) showing the illegal mobile phone usage, the license of the vehicle, and/or any other evidence captured by the system. Such tickets may include relevant information associated with how to pay the appropriate fine and/or the date to appear before a local court responsible for prosecuting the traffic violation.

Figure 2:
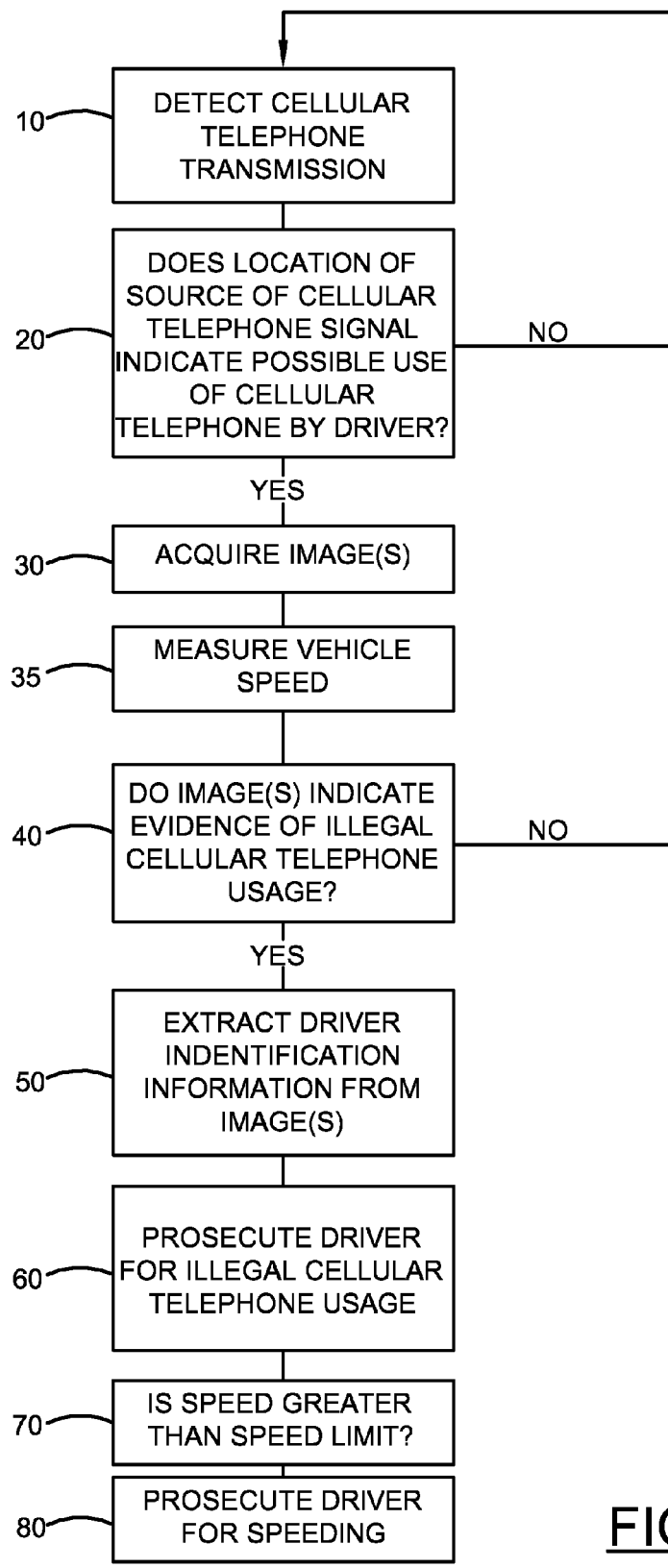
FIG. 2 is a flowchart as in FIG. 1 additionally including a sensor device operative to detect the velocity of a vehicle that is above a speed limit.

Also, it is to be understood that the example described with respect to FIG. 1, is one of many variations of the method steps that may be carried out to determine that a particular vehicle is the source of illegal mobile phone use. For example FIG. 2 shows an alternative embodiment. Here the method comprises a step 35 of measuring the velocity of the vehicle in addition to capturing images of the vehicle. The method may include a further step 70 of determining if a speeding violation has been committed responsive to the velocity of the vehicle detected and the speed limit for the section of the road being monitored by the system. In addition to prosecuting the driver for illegal mobile telephone usage, the method may also include at step 80 prosecuting the driver for exceeding the speed limit. Some of the same information acquisition, such as license plate information, could be used for both prosecutions.

It is to be understood that in alternative embodiments, it may also be possible to perform a similar set of combined data acquisition (mobile phone usage and speeding) but to execute decision-making steps in a different order, namely to first detect speeding violations, and then, for those vehicles for which a speeding violation is detected, examine for illegal mobile telephone usage.

Figure 3:
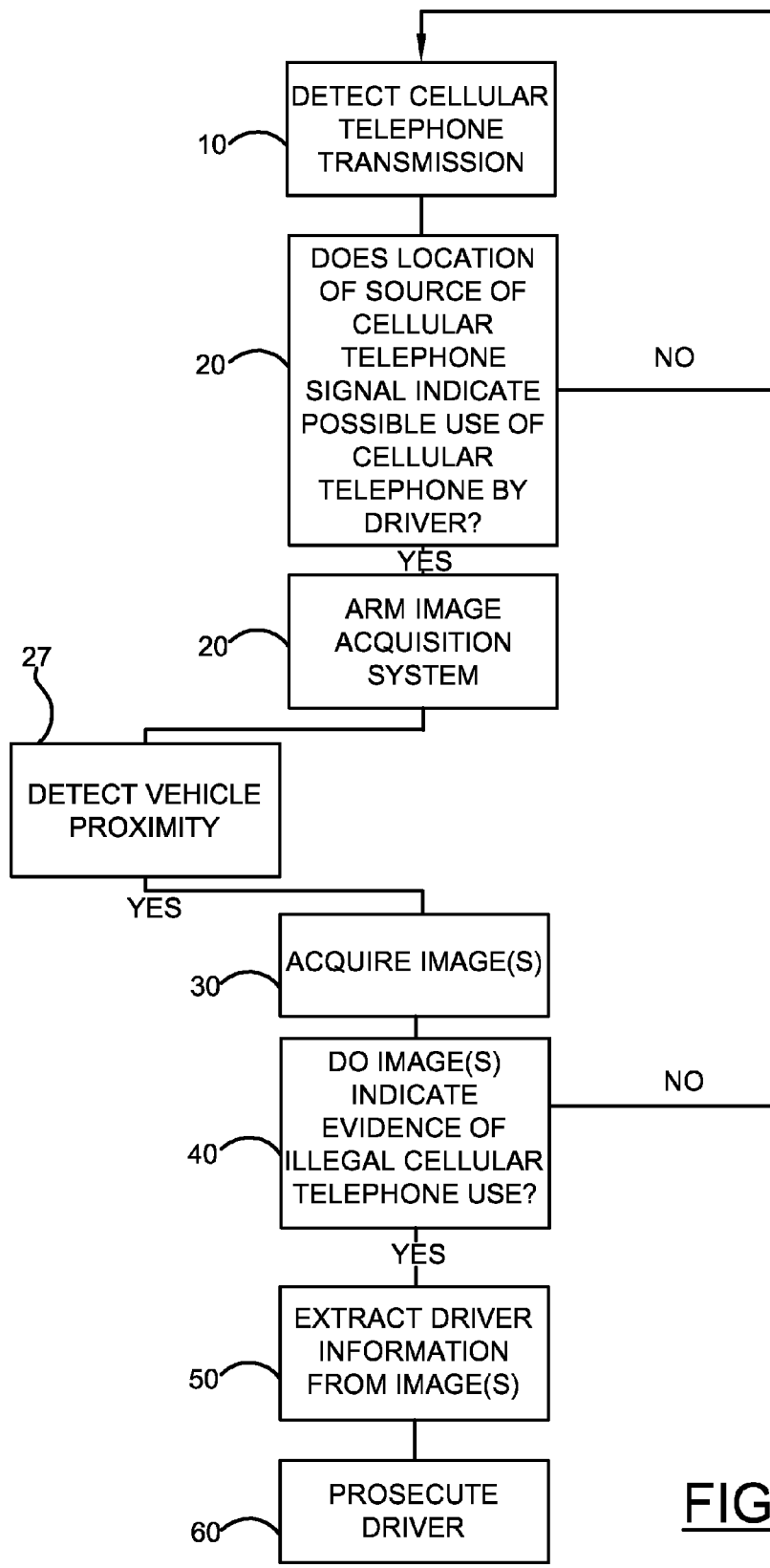
FIG. 3 is a flowchart as in FIG. 1 in which image acquisition is enabled by detection of a mobile telephone transmission and is triggered by a sensor such as a vehicle presence detection device.

A further alternative embodiment of a method for detecting illegal mobile phone usage is shown in FIG. 3. It can be appreciated that the methods already described and illustrated with respect to FIGS. 1 and 2 may include many images acquired during an event may not be useful for purposes of identifying illegal mobile phone usage. To enhance the efficiency of the system, the system may be operative to acquire images which can be used to more easily discern whether a driver is illegally holding a mobile telephone while driving. As shown in FIG. 3, the method may include a further step 25 of arming the image capturing device(s) of the system responsive to the detection of an appropriate mobile phone signal. Before image acquisition takes place, the method may include a step 27 of detecting and evaluating data from other sensor devices, such as a vehicle presence detection device to determine when the car is properly positioned for image capture. When the vehicle presence detection device indicates that the car is located in a predetermined location, the system may then trigger the step 30 of acquiring images. In this described embodiment, the predetermined location may include a location that enables one or more cameras to acquire detailed images of the driver from the front and/or side of the vehicle. The method may further comprise acquiring more than one image at least approximately simultaneously, such as one image depicting the driver and another image depicting a license plate of the vehicle (or images depicting both license plates of the vehicle).

Figure 4:
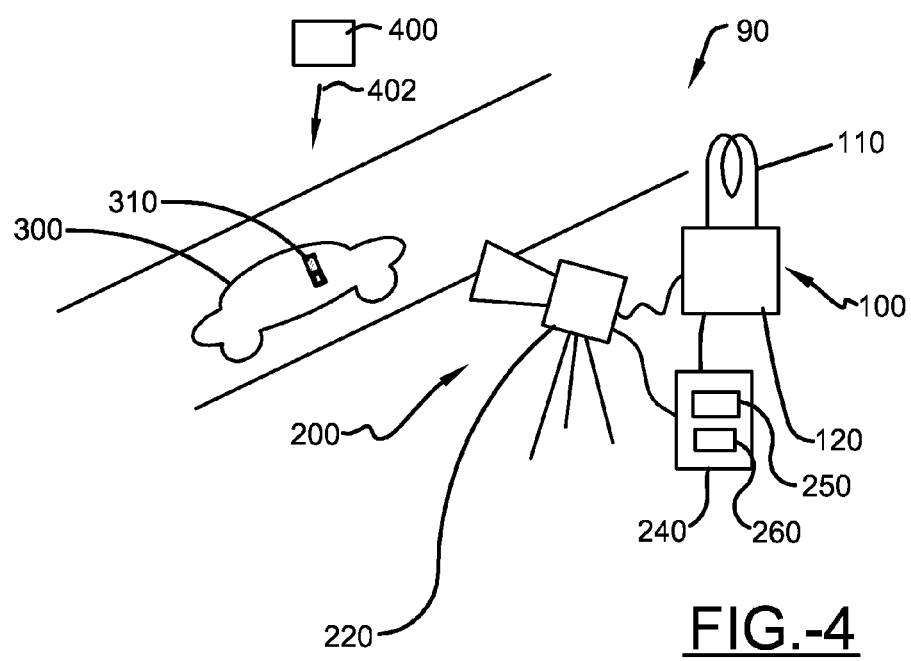
FIG. 4 illustrates an embodiment of a detection system including a mobile phone signal receiving device and an image capturing device.

An embodiment may also comprise an apparatus such as a detection system 90 suitable to perform the described method steps. Such a detection system is illustrated in FIG. 4. The detection system may comprise at least one mobile phone signal receiving device 100 which may comprise at least one antenna 110 in operative connection with at least one receiver 120. The antenna 110 may be suitable to receive signals transmitted from a mobile telephone 310 such as a cellular telephone in vehicle 300. Receiver 120 may be tuned or may comprise a filter which is capable of detecting signals whose carrier frequency corresponds to at least one typical mobile telephone transmission. For example, for common cellular telephone technology, the carrier frequency being monitored may be chosen to be approximately 900 MHz or 1.8 GHz and/or 2.1 GHz.

The described system may use the signal strength of a signal at the selected carrier frequency, as an indicator of distance between the transmitting mobile telephone 310 and receiving antenna 110. As discussed elsewhere herein, the antenna 110 may be an antenna which is only able to receive signals which are fairly strong, i.e., signals having a strength which corresponds to a typical cellular telephone transmitter being located within a known, fairly short distance from the antenna 110. Such an antenna would ordinarily be considered a poorly designed antenna, but may be appropriate for use with the described embodiments to avoid detecting mobile phone usage outside the desired detection area. Alternatively, antenna 110 may be a better-designed antenna with better capability for receiving transmitted signals, and the received signals may be provided to receiver 120, but receiver 120 may comprise a threshold detector such that signals below a predetermined strength are ignored. Signals received by antenna 110 may then enter receiver 120 where they can be amplified, analyzed, recorded or otherwise processed for purposes of the embodiments described herein.

An embodiment of the detection system may further comprise an image acquisition system 200 which may comprise at least one image capturing device 220. Examples of an image capturing device include a still camera, video camera, or any other device operative to capture a visual image of at least portions of the vehicle. In an exemplary embodiment, the image capturing device may include the capability of generating digital images. However, it is to be understood that the image capturing device may also be capable of producing an analog signal corresponding to the captured image or video. In such cases, the image acquiring system 200 may further include a frame grabber board, video capture board, or other image conversion device that is operative to convert analog imaging signals into digital images. However, as discussed below, such an image conversion device may be included in other elements of the detection device.

The image acquisition system and/or one or more image capturing devices may be commanded or armed to operate upon receipt of a command from receiver 120 which indicates that possibly illegal mobile telephone transmissions are emanating from a location in or near the roadway. In exemplary embodiments, the image acquisition system 200 may comprise more than one image capturing device for example pointed in different directions and operative to image the vehicle from different vantage points to capture pictures or video of the driver region of the vehicle and/or the front and rear license plate areas of the vehicle. For example, the system may include a first video camera orientated to capture images from the a side of the driver of the vehicle, while a second video camera is orientated to capture images of the front of the vehicle, while a third video camera is orientated to capture images of the back of the vehicle. With this arrangement, the three video cameras may capture images of the driver, the rear license plate, and the front license plate (if present).

In addition, the image acquisition system may include image capturing devices operative to acquire images both from a vantage point somewhat to the left of the driver and a vantage point somewhat to the right of the driver, so as to be useful in detecting either a mobile telephone held in the driver's left hand or a mobile telephone held in the driver's right hand. Alternatively, an image capturing device may be oriented to acquire only one such image. For example, the image capturing device may be oriented such as to acquire an image obtained from a vantage point sufficiently close to straight in front of the driver so that the image could be used to detect the presence of a mobile telephone in either hand of the driver.

In embodiments of the system, the image capturing devices may be capable of acquiring images of a vehicle with sufficient resolution to determine and document the license plate or other identifying information about the vehicle or to document in sufficient detail what, if anything, the driver is holding. Also, the image acquisition system may be capable of acquiring more than one image over time pertaining to a particular possible violation event and may be capable of acquiring more than one image from more than one vantage point over time, such as any combination of front, rear and/or side image and/or images at different angles captured over several seconds or longer.

In addition to the captured images of the vehicle, the detection system may also be operative to acquire (and store in association with the images) other desired information about when and where the image was acquired, or any other information of interest. The information about where the images were taken could come from a global positioning system which is part of the detection system. Alternatively, the information could be entered or programmed into the system at the time the system is set up or installed in a particular location. In addition the detection may also be operative to store (in association with the images) information from or about the mobile phone signal associated with the event. For example, the stored mobile phone signal information may include determined characteristics of the mobile phone signals, such as its strength. Also, the stored mobile phone signal information may include data included in the signal such as data which identifies the mobile phone device, a telephone number, data identifying the cellular telephone towers involved in communicating with the device, and/or any other data that can be determined from the mobile phone signal.

Mobile phone signals may include an encrypted portion. Some embodiments of the system may be operative to decrypt the signals and/or may be operative to communicate with servers which are operative to decrypt the signal and return decrypted data included in the mobile phone signal. In embodiments of the system that do not have the ability to determine the content of encrypted portions of the mobile phone signal, the system may still be operative to store a copy of the signal. Such a stored copy of the mobile phone signal for an event may be made available for use in prosecuting a person for illegal use of a mobile phone. At the time of the prosecution, the stored mobile phone signal may be retrieved from the data store and decrypted by the entity (e.g. mobile phone service) responsible for establishing the encrypted communication with the mobile phone.

During prosecution of an offender, the system may be operative to carry out or assist in carrying out correlation of the information about where and when the telephone signal was detected by the detection system, with information in the offender's mobile phone signal. In addition, the system may be capable of interfacing with mobile phone services to retrieve records corresponding to the particular telephone call carried out with the detected mobile phone signals. Such records may include further details of the call, such as the telephone numbers involved, the duration of the call, global positioning information associated with the location of the mobile phone at the time of the call, and/or any other information stored by the mobile phone service which facilitated the mobile phone call for the mobile phone detected by the system.

In embodiments in which the system is not capable of automatically interfacing with a mobile phone service to retrieve such telephone call records, the system may be operative to output information for law enforcement which may be used to request the relevant telephone call records from the appropriate mobile phone network.

In an embodiment, the system may further comprise a timer or clock whose time information is associated with the other information acquired. This time information may be incorporated into the images. The system may further associate or stamp acquired images with information about where the images were taken. The system may also be operative to digitally sign and/or digitally time stamp images and/or other acquired data regarding an event.

As shown in FIG. 4, the detection system 90 may further comprise at least one storage system 240 capable of storing the mobile phone signals, images, and other acquired information for an event. Such a storage system may include a computer 250 and one or more storage devices 260 such as a hard drive, flash memory drive, tape system, or any other device capable of storing the acquired information for an event. Also, all or portions of the data for each event may be stored in one or more records of a data store such as a database managed by the computer and stored on the storage device or stored in a remote server in operative connection with the computer. The computer of the storage system may also be operative to control operation of the image acquisition system 200 such as the image capturing devices 220. The computer of the storage system may further be operative to control operation of the receivers 120. However, it is to be understood that the detection system may include a computer that is physically separate from the storage system 240, which computer is operative to interface and control the one or more of the components of the described detection system.

Figure 5:
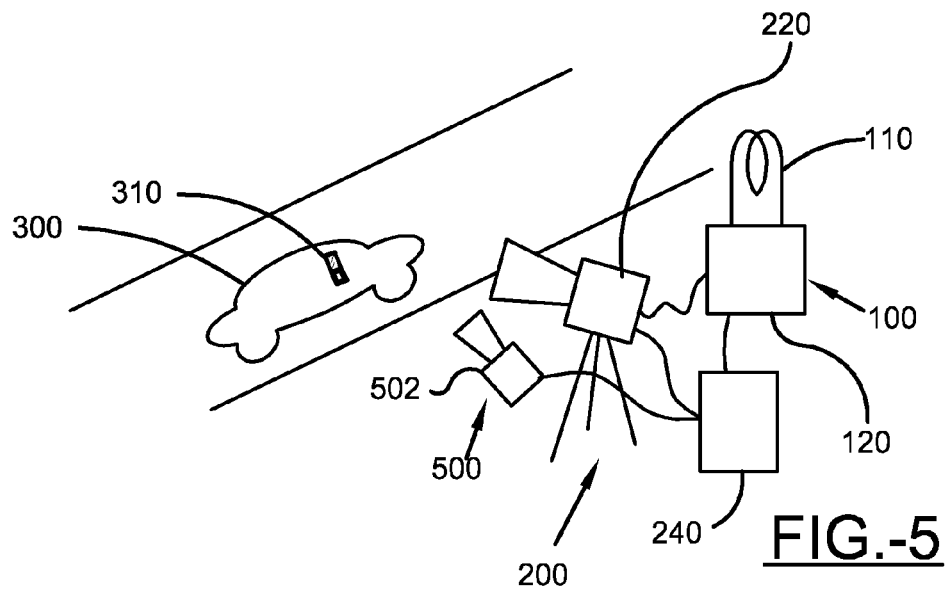
FIG. 5 illustrates the detection system of FIG. 4 further including a sensor device for measuring the speed of the vehicle.

As discussed previously, in addition to capturing images of the vehicle associated with mobile phone signals, the system may include one or more sensor devices operative to acquire other features of the vehicle. For example, as shown in FIG. 5, the system may include a sensor device 500 in the form of a vehicle velocity measuring device 502. Another example of sensor devices which the system may include is a vehicle presence detection device such as motion detection devices, proximity detection devices, and vehicle position sensing devices. Also, it is to be understood that the system may include any other type of sensor device capable of capturing data regarding the location, speed, identity, or any other information which may be useful for correlating a mobile phone signal with a particular vehicle and/or which may be useful with prosecuting an offender. As discussed previously, information acquired from such sensor devices 500 may be stored for the event by the storage system 240.

Figure 6:
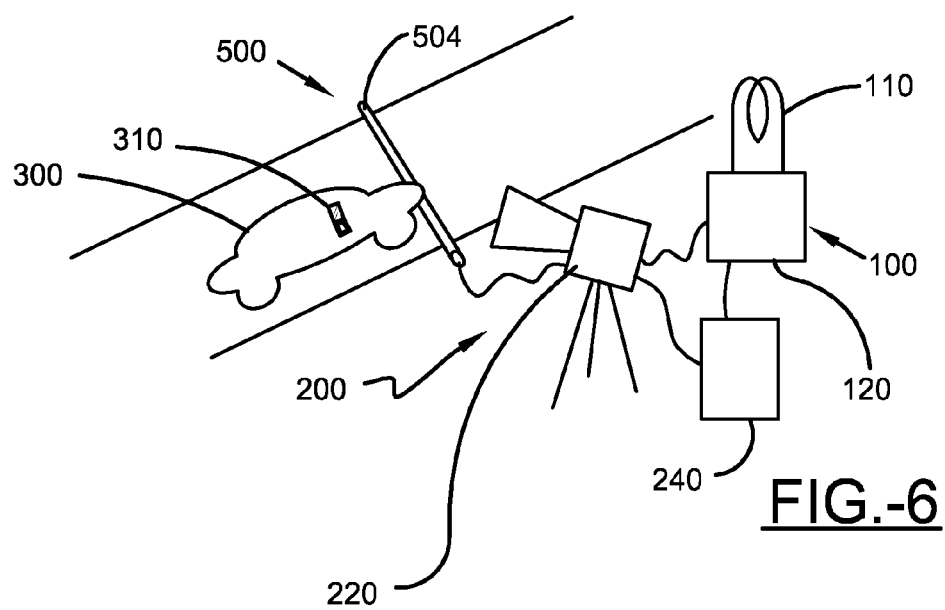
FIG. 6 illustrates the detection system of FIG. 4 in which signal detection enables or arms the system and a trigger causes image acquisition.

As discussed previously an embodiment may further be operative to enable or arm the triggering of the image acquisition system. This further variation of the detection system is illustrated in FIG. 6. In this example, receipt of a mobile telephone transmission by receiver 120 would enable or arm image acquisition system 200. FIG. 6 shows the addition of a sensor device 500 that is operative to trigger acquisition of images by the image acquisition system after the acquisition of images has been enabled or armed. Here, the sensor device 500 may be in the form of a vehicle presence detector device 504. Such a vehicle presence detection device may include a sensor strung across the roadway which registers when the force of a vehicle's tire is exerted thereon, or could be a sensor which detects the presence of a vehicle by the breaking of a beam of light, or it could be a sensor which detects the metal of a vehicle, or it could be a sensor which detects changes in capacitance caused by the vehicle, or it could be any other appropriate type of sensor operative to detect the presence or position of the vehicle. Output from this sensor could serve as a trigger for image acquisition by the image acquisition system. Image acquisition could occur or begin either immediately upon receipt of a trigger from such a sensor device 504, or could occur or begin after a known time delay after receipt of a trigger from such a sensor device 504.

In a further embodiment, the system may continually acquire video images from each image capturing device which are stored in a respective buffer in a frame grabber and/or in the storage system 240. The buffer may be repeatedly overwritten with newly captured images. However, responsive to the detection of the vehicle by the sensor device 500, and/or responsive to the detection of a mobile phone signal by the signal receiving device 100, the system may be operative to begin storing portions of the buffer in a storage location outside the buffer. In an embodiment, the system may be configurable to enable selection of which images before and/or after a triggering event that should be copied and saved from the buffer. For example, upon detection of the presence of the vehicle and/or the presence of a mobile phone signal, the system may be operative to save from the buffer a pre-selected number of video frames both before and after the triggered event to a portion of the storage system 240. Also, rather than or in addition to selecting the number of frames, the system may be configurable to set the time duration before and/or after a triggered event to save frames from the buffer. The saved images may be stored in the storage system in association with any other data captured for the event.

In a further embodiment, image recording could be done on a continuous basis and all of the images could be stored or retained. The receipt of a signal from a mobile telephone or any other triggering device could cause the detection system to flag the relevant images by storing the time of the detection in the storage device. The system may alert or at least report to law enforcement that triggering events occurred which may correspond to illegal mobile phone usage. The appropriate portions of the stored video corresponding to the times recorded by the system for an event, may later be reviewed by law enforcement personnel to determine if an illegal mobile phone usage can be prosecuted.

In embodiments, it is further possible that the detection system may generate reports which are relevant to use of the equipment in an unattended manner. In embodiments, the detection system may report back to a monitoring station (which may be a police facility or other location) any occurrence of possible illegal mobile telephone usage and the associated images captured by the system. In embodiments, the detection system may report back when its capacity for acquiring images is full or nearly full. In embodiments, the detection system may store its acquired images and other information internally and/or may communicate such information to another location, either wirelessly or through wires, either at the time of acquisition of such information or upon the command to transmit such information. In embodiments, the detection system may transmit, either continuously or upon query, information about the status of the detection system. In embodiments, the detection system may comprise a display or lights suitable to display information about the status of the detection system. The detection system may comprise keypads, pointer devices or similar input features. The detection system may comprise an image display suitable to display acquired images. The detection system may comprise interfaces for connecting other systems such as for downloading acquired images and information from the detection system, or for loading instructions into the detection system.

Figure 7:
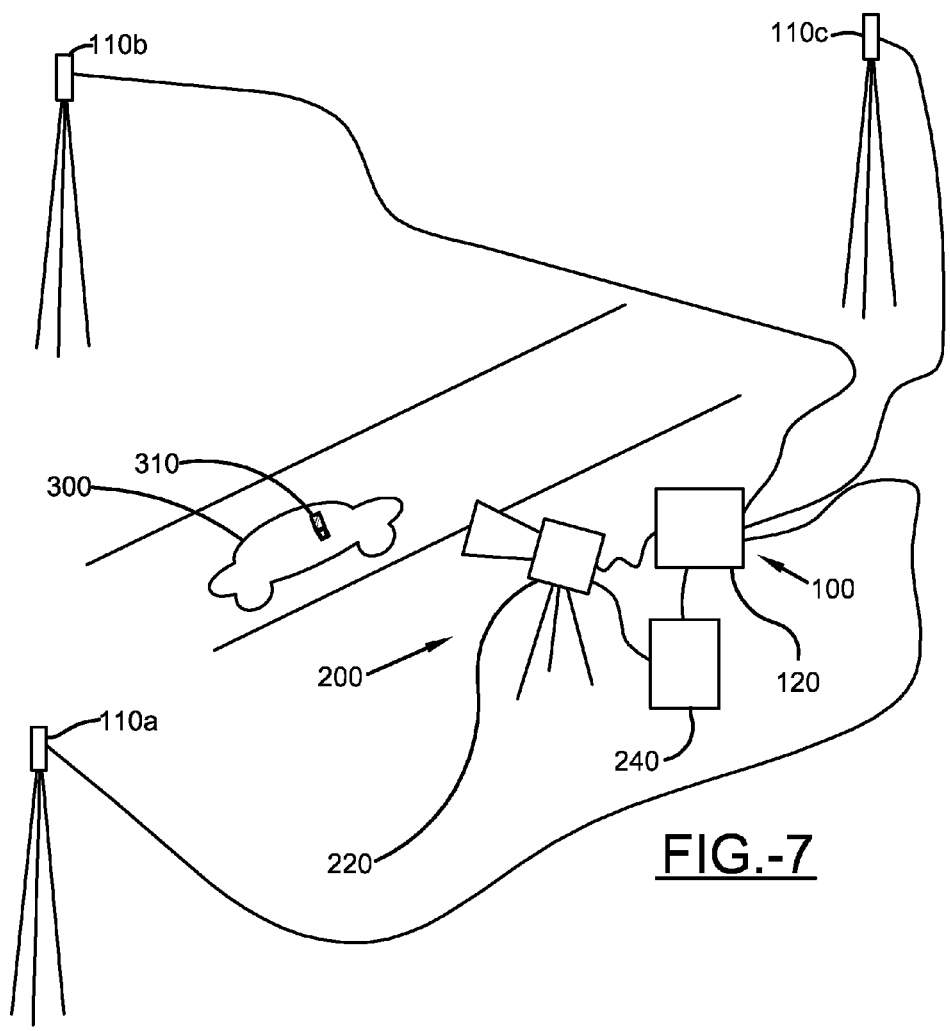
FIG. 7 illustrates a detection system which uses triangulation involving multiple antennas.

FIG. 7 illustrates a further embodiment of the system. In general, location of a transmitter can be determined by triangulation if a signal is transmitted from one location to three or more receivers at known locations (or, for signal transmission in the opposite direction, if a signal is transmitted to one location from three or more transmitters at known locations). Frequently a cellular telephone may be in contact with more than one telephone receiver such as a cellular telephone tower. The arrival times of signals at each of the receivers could be used to determine the position of the transmitting mobile telephone, and then to determine whether the transmitting mobile telephone is or is likely to be within the physical bounds of a roadway. The relative signal strengths may also enter into such a determination. FIG. 7 illustrates that three antennas 110*a*, 110*b* and 110*c* may be connected to one or more receivers 120. Signals from the three antennas may be used by the detection system to determine that the location from which cellular telephone transmission is emanating corresponds to the portion of the roadway being monitored by the system. Other aspects of this embodiment can be carried out as described elsewhere herein. In a further embodiment, two antennas may provide some information about possible locations of a mobile telephone transmission, especially if there are only a limited number of roads or likely locations. Also changes, with respect to time, in the signal strength or other characteristics of the received signal can be interpreted to indicate whether the source of the signals is moving, and is likely located in the roadway being monitored.

As shown in FIG. 4, in a further embodiment, the system may include a transmitter device 400, capable of communicating the presence of the jurisdiction in which mobile phone usage while driving is prohibited. The transmitter device may be positioned to continuously broadcast a warning signal 402 near the described system or elsewhere in the jurisdiction such as adjacent a major road entering the jurisdiction. Such a warning signal may include a warning message. In an embodiment, the warning signal may be capable of interrupting an ongoing mobile phone call and cause the mobile phone device to output the warning message. An example warning message may include the verbal output of "Mobile phone usage while driving in this city is prohibited" or other suitable warning.

In an embodiment, the system may be operative to detect or determine the mobile phone number associated with the detected mobile phone signal. Using this determined number, the system may be operative to contact the mobile phone and communicate the warning either verbally or through a text message or other communication feature of the device.

In an alternative embodiment, the mobile phone may me adapted to include the capability of monitoring for warning signals. For example, manufactures of mobile phones may include in the phone a sensor operative to detect a standardized warning signal and responsive thereto to emit an audible warning sound or verbal message.

In an alternative embodiment, rather than providing a warning, the system may contact the determined mobile phone number and communicate information regarding the violation of the law. For example, the system may communicate the message "Use of this mobile phone device was detected while moving in a vehicle. The license plate of the vehicle has been photographed and the owner of the vehicle may be cited upon further review by law enforcement." Also in further alternative embodiments, the message communicated to the mobile phone may include details regarding the fine and/or need for a court appearance. Further, the message may include a telephone number, address or web site which can be contacted for purposes of verifying that the car has been ticketed and/or for use with paying the fine associated with the violation.

The previously described image capturing devices may include still or video cameras operative to capture images of visible light. However, it is to be understood that the image capturing devices may also include cameras or other devices operative to capture non-visible light such as infrared radiation.

In an embodiment, infrared cameras may capture images of the vehicle which show the location of warm objects inside the vehicle, such as people. If only one warm object is detected in the vehicle, the system may be operative to determine and/or indicate that the vehicle includes only one occupant that is both driving the vehicle and using a mobile phone. Such a determination can be made using an infrared camera in cases such as at night when it is too dark to capture images of the occupants of the vehicle with a visible light camera. Also, in cases, where the driver is using a hands-free mobile phone, a determination of only a single occupant in the vehicle using an infrared camera, can be used by the system to indicate likely illegal use of a mobile phone by the driver of the car.

In addition to using image capturing devices to determine information about the occupants of a vehicle, in alternative embodiments other types of sensors may be used. For example, an ultrasonic detector may direct an ultrasonic signal into the vehicle. Features of the reflected ultrasonic signal may be used to determine characteristics of the inside of the vehicle.

In an embodiment, characteristics of the inside of the vehicle gathered from visible light cameras, infrared cameras, or other types of detectors such as ultrasonic detectors may be evaluated by an expert system, neural network, or other artificial intelligence system. Such an artificial intelligence system may be implemented as a software program in the previously described computer and/or may be implemented in another computer in operative connection with the described detection system. The artificial intelligence system may be operative to determine from the various types of images and other signals captured for the vehicle, whether the vehicle includes one or more occupants, and which one of the occupants is likely using a mobile phone.

Further such an artificial intelligence system may be operative to determine if other violations of the law are being committed. For example, the artificial intelligence system may be operative to determine if a baby carrier or child seat is present in the vehicle and if a baby or child is presently in the baby carrier or child seat. Further, the artificial intelligence system may be operative to determine whether the baby carrier or child seat is facing in the wrong direction and/or is illegally mounted in the front of the vehicle. Further the artificial intelligence system may be operative to determine if a baby or small child is present in the vehicle but is not sitting in a baby carrier or child seat. In addition, some jurisdiction may prohibit an adult from smoking in a vehicle while a baby or child is also in the vehicle. The previously described image capturing devices may provide images capable of being used by the described artificial intelligence system to determine whether an adult is smoking while a child is present in vehicle. Determination of these possible illegal activities may be reported by the system to law enforcement or other persons capable of issuing citations to persons associated with the vehicle.

In the described embodiments, the system and method steps have been described as being carried out by various components of the system. Such components may include one or more computers that are operative to carry out the steps and features described herein. For example, the computer may be operative to acquire the data captured by one or more of the described cameras, mobile phone signal detectors, and other sensor devices and store the data from a detected event in a data store locally and/or remotely from the computer. Further the computer may be operative to carry out the monitoring of acquired data to determine when to trigger events such as capturing images of a moving vehicle. Further the computer may be operative to carry out correlating data from different devices to determine which vehicle on the road is the source of mobile phone signals. In addition, the computer may be operative to carry out signal analysis and/or image analysis on the information provided by the various detectors to achieve a more accurate determination of whether illegal mobile phone usage is taking place in a particular vehicle. Also the computer may be operative to carry out wired and/or wireless communication of the acquired information to one or remote locations, such as further computers and servers operative to review, report and/or evaluate the information captured and determined by the described system.

Computer software instructions used in operating the described systems and connected computers may be loaded from computer readable media or articles of various types into the respective computers. Such computer software may be included on and loaded from one or more articles such as compact disks, DVDs and other optical or magnetic media. Such software may also be included on articles such as hard disk drives, tapes, flash memory drives or other rewritable or read-only drives and storage devices. Other articles which include data representative of the instructions for operating computers in the manner described herein are suitable for use in achieving operation of the systems and methods in accordance with the described embodiments.

Thus the new mobile phone detection systems and methods described herein achieve one or more of the above stated aspects, eliminate difficulties encountered in the use of prior devices and systems, solve problems and attain the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the embodiment in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. A method comprising:
   a) receiving at least two mobile phone signals respectively with at least two spaced apart antennas from a mobile telephone device located in a moving vehicle;
   b) capturing at least one image of the vehicle from which the at least two mobile phone signals are received, using at least one image capturing device;
   c) through operation of at least one computer responsive to the at least two mobile phone signals received in (a), determining whether the vehicle corresponds to the source of the at least two mobile phone signals;
   d) through operation of the at least one computer, enabling the at least one image to be used to determine if a person associated with the vehicle should be prosecuted for illegal use of a mobile phone while driving the vehicle.

2. A method comprising:
   a) monitoring a roadway to detect a transmission of a mobile phone signal from a location of the roadway;
   b) monitoring the roadway to detect a presence of a vehicle in the location of the roadway;
   c) through operation of at least one processor, determining that the mobile phone signal detected in (a) was transmitted from the location in the roadway when the vehicle detected in (b) was present in the location in the roadway; and
   d) responsive to (c) through operation of the at least one processor, storing in at least one data store at least one image of the vehicle.

3. The method according to claim 2, further comprising capturing a plurality of images of the vehicle through operation of at least one image capturing device, wherein the plurality of images include at least one image of the license plate of the vehicle and at least one image of the driver of the vehicle, wherein (d) includes storing the at least one image of the license plate of the vehicle and the at least one image of the driver of the vehicle in the at least one data store.

4. The method according to claim 2, wherein (d) includes through operation of the at least one processor, storing in the at least one data store the at least one image in correlated relation with data representative of the mobile phone signal detected in (a).

5. The method according to claim 2, wherein prior to (c) further comprising measuring a velocity of the vehicle, wherein (c) includes determining that a source of the mobile phone signal was moving with a velocity that corresponds to the velocity of the vehicle.

6. A method comprising:
   a) receiving a mobile phone signal from a mobile telephone device located in a moving vehicle;
   b) detecting with a sensor device further information associated with the vehicle, wherein the sensor device includes a vehicle velocity measuring device, wherein the further information includes a velocity associated with the vehicle;
   c) through operation of at least one computer, comparing characteristics of the mobile phone signal received in (a) to the velocity of the vehicle detected in (b) to determine whether the vehicle corresponds to a source of the mobile phone signal;
   d) capturing at least one image of the vehicle from which the mobile phone signal is received, using at least one image capturing device;
   e) storing the at least one image captured in (d), information associated with the mobile phone signal received in (a), and the further information detected in (b) in at least one storage device; and
   f) through operation of the at least one computer, enabling the at least one image and portions of the information stored in the at least one data store to be used to determine if a person associated with the vehicle should be prosecuted for illegal use of a mobile phone while driving the vehicle.

7. The method according to claim 2, wherein (b) includes monitoring the roadway to detect the presences of the vehicle in the location of the roadway through operation of a sensor device operative to provide information indicating the presence of the vehicle.

8. The method according to claim 2, wherein (a) includes detecting the mobile phone signal with at least two spaced apart antennas; wherein (c) includes, through operation of the at least one processor, determining whether the vehicle corresponds to the source of the mobile phone signal, responsive to respective signals provided by the at least two spaced apart antennas.

9. A method comprising:
   a) receiving a mobile phone signal from a mobile telephone device located in a moving vehicle;
   b) detecting with a vehicle presence detection device, information indicating a presence of the vehicle;
   c) through operation of at least one computer, comparing characteristics of the mobile phone signal received in (a) to characteristics of the information indicating the presence of the vehicle detected in (b) to determine whether the vehicle corresponds to a source of the mobile phone signal;
   d) capturing at least one image of the vehicle from which the mobile phone signal is received, using at least one image capturing device;
   e) storing the at least one image captured in (d) and information associated with the mobile phone signal received in (a) in at least one storage device; and
   f) through operation of the at least one computer, enabling at least portions of the information and the at least one image stored in the at least one storage device to be used to determine if a person associated with the vehicle should be prosecuted for illegal use of a mobile phone while driving the vehicle.

10. The method according to claim 2, further comprising:
    e) determining information included in the mobile phone signal, wherein the information includes at least one of a telephone number and a mobile phone identifier.

11. The method according to claim 2, further comprising:
e) determining at least one address associated with at least one of information included in the at least one image and information included in the mobile phone signal;
f) through operation of the at least one processor, enabling the at least one address determined in (e) to be used to communicate at least one message to the at least one address determined in (e), wherein the at least one message includes information regarding the usage of a mobile phone in the vehicle.

12. An apparatus comprising:
at least one mobile phone signal receiving device, wherein the mobile phone signal receiving device is operative to detect a mobile phone signal transmitted from a vehicle in a location of a roadway;
at least one device operative to detect a presence of the vehicle in the location of the roadway and to capture an image of the vehicle in the roadway;
at least one storage device;
at least one computer, wherein the at least one computer is operative to determine that the mobile phone signal was transmitted from the location in the roadway when the at least one device indicates that the vehicle was present in the location in the roadway, wherein the at least one computer is operative to store in the at least one storage device, the at least one image of the vehicle.

13. The apparatus according to claim 12, wherein the at least one computer is operative to store, in the at least one storage device, information associated with the mobile phone signal transmitted from the vehicle.

14. The apparatus according to claim 12, wherein the at least one device comprises a plurality of image capturing devices, wherein at least one of the plurality of image capturing devices is operative to capture at least one image of a driver of the vehicle, wherein at least one of the plurality of image capturing devices is operative to capture at least one image of at least one license plate of the vehicle, wherein the at least one computer is operative to store the images captured from the plurality of image capturing devices on the storage device.

15. The apparatus according to claim 12, wherein the at least one device comprises at least one vehicle presence detection device and at least one image capturing device.

16. An apparatus comprising:
at least one mobile phone signal receiving device, wherein the mobile phone signal receiving device is operative to detect a mobile phone signal transmitted from a vehicle;
at least one image capturing device, wherein the at least one image capturing device is operative to capture at least one image of the vehicle from which the mobile phone signal is detected;
a vehicle velocity measuring device operative to measure a velocity associated with the vehicle;
at least one storage device;
at least one computer in operative connection with the mobile phone signal receiving device, the at least one image capturing device, the vehicle velocity measuring device, and the at least one storage device;
wherein the at least one computer is operative to store the velocity of the vehicle and at least one image of the vehicle in the at least one storage device;
wherein the at least one computer is operative to compare characteristics of the mobile phone signal transmitted from the vehicle to the velocity of the vehicle to determine whether the vehicle corresponds to a source of the mobile phone signal; and
wherein the at least one computer is operative to enable at least portions of the data stored in the at least one storage device to be used to determine if a person associated with the vehicle should be prosecuted for illegal use of a mobile phone while driving the vehicle.

17. An apparatus comprising:
at least one mobile phone signal receiving device, wherein the mobile phone signal receiving device is operative to detect a mobile phone signal transmitted from a vehicle;
at least one image capturing device, wherein the at least one image capturing device is operative to capture at least one image of the vehicle from which the mobile phone signal is detected;
a vehicle presence detection device operative to determine information indicating a presence of the vehicle;
at least one storage device;
at least one computer in operative connection with the mobile phone signal receiving device, the at least one image capturing device, the vehicle presence detection device, and the at least one storage device;
wherein the at least one computer is operative to store, in the at least one storage device, the at least one image of the vehicle;
wherein the at least one computer is operative to compare characteristics of the mobile phone signal to characteristics of the information indicating the presence of the vehicle to determine whether the vehicle corresponds to a source of the mobile phone signal; and
wherein the at least one computer is operative to enable at least portions of the data stored in the at least one storage device to be used to determine if a person associated with the vehicle should be prosecuted for illegal use of a mobile phone while driving the vehicle.

18. The apparatus according to claim 12, wherein the at least one computer is operative to determine information included in the mobile phone signal, wherein the information includes at least one of a telephone number and a mobile phone identifier, wherein the at least one computer is operative to store the information determined from the mobile phone signal in the at least one storage device.

19. The apparatus according to claim 12, comprising at least two spaced apart antennas, wherein each antenna is operative to produce a signal responsive to the mobile phone signal transmitted from the vehicle, wherein the at least one computer is operative to compare the signals produced by the at least two antennas to determine whether the vehicle corresponds to a source of the mobile phone signal.

* * * * *